United States Patent
Hizume et al.

[15] 3,651,688
[45] Mar. 28, 1972

[54] VIBRATION FORCE EXCITING METHOD AND APPARATUS

[72] Inventors: Akio Hizume; Shuji Ohyagi; Shigeho Tanaka, all of Nagasaki, Japan

[73] Assignee: Mitsubishi Jukogyo Kabushiki Kaisha, Tokyo, Japan

[22] Filed: May 22, 1970

[21] Appl. No.: 39,906

[30] Foreign Application Priority Data

May 24, 1969 Japan....................................44/40333

[52] U.S. Cl..............................................73/71.5
[51] Int. Cl.......................................G01m 7/00, B06b 1/06
[58] Field of Search..................73/67, 67.2, 71.5, 67.3, 67.4, 73/70.1

[56] References Cited

UNITED STATES PATENTS 3,292,425  12/1966  Conn ..........................................73/67

FOREIGN PATENTS OR APPLICATIONS 934,164  8/1963  Great Britain...........................73/67.2

*Primary Examiner*—Richard C. Queisser
*Assistant Examiner*—John P. Beauchamp
*Attorney*—McGlew and Toren

[57] ABSTRACT

A machine rotor, having projecting members extending radially from its periphery, such as the vaned rotor of a turbine, is subjected, while remaining stationary, to the vibration sources which would act upon the vanes during actual rotation of the rotor. In the testing, a first vibration force, having a number of vibrations equal to the product of the design r.p.m. of the rotor and the number of vibration exciting sources acting thereon during rotation, is produced. A second vibration force having a number of vibrations equal to the design r.p.m. of the rotor is also produced. The first vibration force is superposed on the second vibration source during only that period in which the second vibration is normally produced. The resultant of the superposed vibration forces is applied sequentially to successively adjacent projecting members of the stationary rotor at a phase difference equal to the reciprocal of the product of the r.p.m. and the number of projecting members or vanes. The apparatus includes successively triggered flip-flop circuits each effective to apply an exciting potential to a piezo-electric vibrating member mounted on a respective vane. Gating means are associated with the flip-flops in a manner such that the width of the pulses applied to the vibrating elements simulate the widths of the vibrating pulses actually present during operation of the rotor.

4 Claims, 18 Drawing Figures

INVENTORS
AKIO HIZUME
SHUJI OHYAGI
SHIGEHO TANAKA by McGlew & Toren
ATTORNEYS

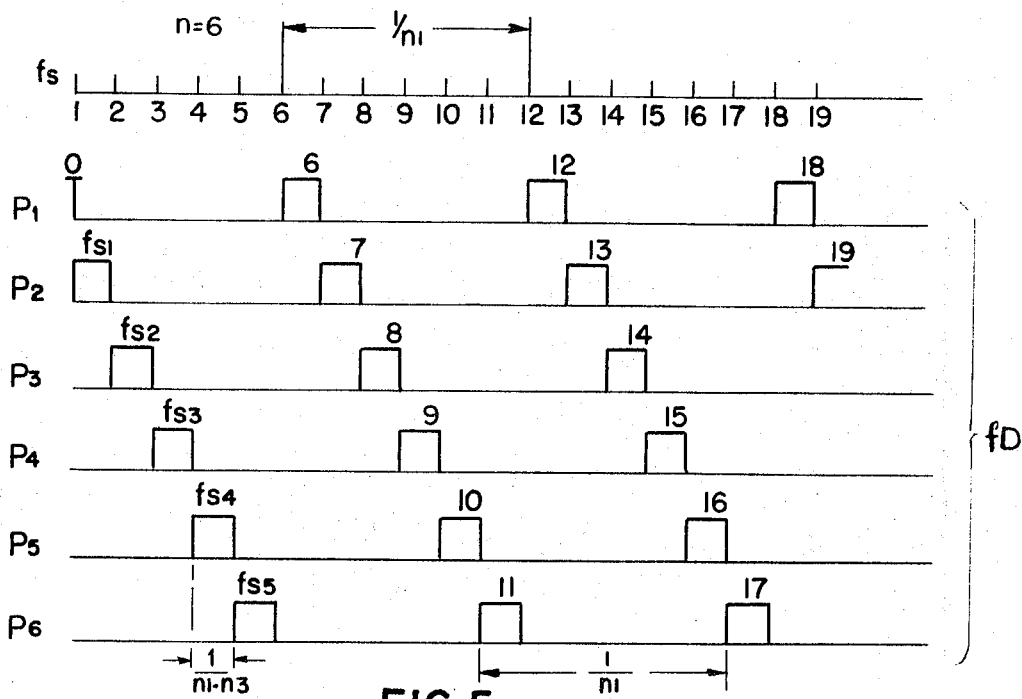

| Flip-flop No. | Waveform Diagram | Corresponding Vane No. |
|---|---|---|
| $F_1^{PI}$ | | 1 |
| $F_2^{PI}$ | | |
| $F_3^{PI}$ | | 2 |
| $F_4^{PI}$ | | |
| $F_5^{PI}$ | | 3 |
| $F_6^{PI}$ | | |
| $F_7^{PI}$ | | 4 |
| $F_8^{PI}$ | | |
| $F_9^{PI}$ | | 5 |
| $F_{10}^{PI}$ | | |
| $F_{11}^{PI}$ | | 6 |
| $F_{12}^{PI}$ | | |
| $F_1^{PO}$ | | 1 |
| $F_2^{PO}$ | | 2 |
| $F_3^{PO}$ | | 3 |
| $F_4^{PO}$ | | 4 |
| $F_5^{PO}$ | | 5 |
| $F_6^{PO}$ | | 6 |

FIG. 12

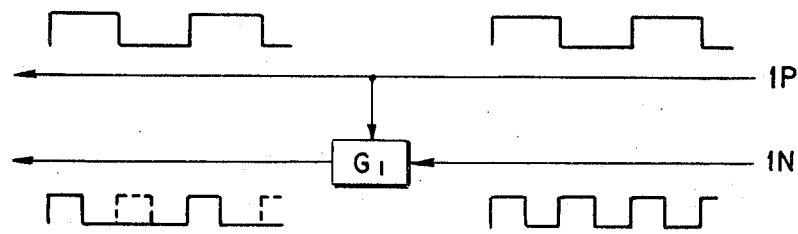
FIG.13
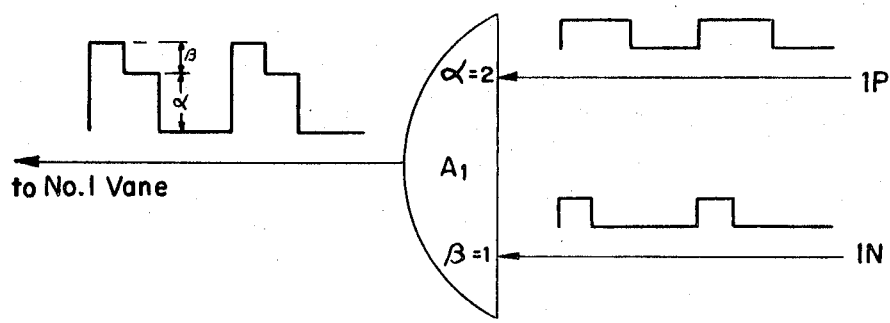
FIG.14
| Flip-flop No. | Waveform Diagram | Corresponding Vane No. |
|---|---|---|
| $F_1^{PI}$ | | 1 |
| $F_2^{PI}$ | | 2 |
| $F_3^{PI}$ | | 3 |
| $F_4^{PI}$ | | 4 |
| $F_5^{PI}$ | | 5 |
| $F_6^{PI}$ | | 6 |
| $F_1^{PO}$ | | 1 |
| $F_2^{PO}$ | | 2 |
| $F_3^{PO}$ | | 3 |
| $F_4^{PO}$ | | 4 |
| $F_5^{PO}$ | | 5 |
| $F_6^{PO}$ | | 6 |
FIG.18
INVENTORS
AKIO HIZUME
SHUJI OHYAGI
SHIGEHO TANAKA
by
McGlew & Toren
ATTORNEYS

VIBRATION FORCE EXCITING METHOD AND APPARATUS

In rotating fluid machines such as steam turbines and gas turbines, projected members such as moving vanes are mounted on the periphery of the rotating body at certain definite intervals, a certain definite number of vibration exciting sources, such as stator blades or nozzles, is mounted adjacent to the projected members, and the exciting force being the energy of the fluid jet from between the stator blades or from the nozzles is applied to the projected members whereby the rotating body is driven.

More specifically, the moving vanes, when rotated integrally with the rotating body, receive an impact force due to change in the flow in the fluid hitting the moving vanes each time the moving vanes pass the stator blades or nozzles and, as a result, the moving vanes receive, per unit time, a vibration force in terms of the product ($f_1 = n_1 \times n_2$), where $n_1$ represents the r.p.m. of the rotating body, and $n_2$ the number of rotor blades or nozzles. The elapsed time between impact of a respective stator blade or nozzle on two successive moving vanes corresponds to the value $1/(n_1 \cdot n_3)$ which is the reciprocal of the product of the number $n_1$ of the r.p.m. of the rotating body and the number $n_3$ of the moving vanes. In other words, each moving vane adjacent to the preceding one receives a vibration force (hereinafter referred to as "first vibration force") at a phase difference equal to the period $1/(n_1 \cdot n_3)$.

In the high pressure nozzles of a steam turbine or the like, steam is admitted thereto not around the whole circumference, but, for example, around a half circumference, since the other half has a steam shut-off arrangement. Therefore the moving vane is to receive another vibration force attributable to the partial admission, namely to receive the vibration force $f_2 = n_1$ (hereinafter referred to as "second vibration force") whose frequency is equal to the r.p.m. $n_1$ of the rotating body. In this case, too, the phase difference between the vibration forces applied to a certain specific moving vane and the the adjacent moving vane is equal to the time $1/(n_1 \cdot n_3)$.

Linked by means of edge joints, rivets, metal or the like, several moving vanes make up a set, and thus a finite cascade is formed. This makes it difficult to analyze the logical basis of the vibration, unlike in the single vane or infinite cascade vanes which easily permit mathematical analysis. In the finite cascade, it is very often necessary to measure the vibrating state of the moving vanes.

The apparatus as shown in FIGS. 1 and 2 has hitherto been used to reproduce the vibrating state of the moving vane, which is the projected member of the rotating body, without actually operating the rotating body of a vibration system, and thus to find the vibration characteristics of the moving vane.

This conventional apparatus includes a vibration exciting body 4, in which water jet nozzles 3 are used instead of the steam jet nozzles in the same number, and are disposed at equal intervals correspondingly facing the moving vanes 2 embedded in the circumference of a rotary disc 1 at equal intervals, a turbine drive shaft 5 coupled with said rotary disc 1 is rotatably mounted in a support member (not shown herein diagramatically), a box 6 enclosing the rotary disc 1, moving vanes 2 and a vibration exciting body 4. Pressurized water is applied to vibration exciting body 4 from a pump (not shown herein), and the moving vanes 2 are driven by water jets from water nozzles 3 of the vibration exciting body 4.

The moving vanes 2 and rotary disc 1 are rotated by a driver turbine or the like (not shown) and, at the same time, a vibration force is given periodically to the moving vanes 2 by the jet water directed unevenly toward the circumference of the rotating body.

In order to supply the second vibration force, jet nozzles 3, excepting several closed ones 3', are used.

A strain gauge 7 is attached to a moving vane 2, the lead wire from the strain gauge is connected to the slip-ring 8 on the drive shaft 5 whereby the strain in the moving vane 2 to which the gauge 7 is affixed is measured and, at the same time, the r.p.m. of the drive shaft 5 (namely, the number of vibrations applied to the moving vane 2 is measured by using an r.p.m. detecting pickup 9, and thus the vibration characteristics of the moving vane 2 are obtained.

According to this vibration force exciting apparatus, it is necessary to manufacture a vibration testing rotor each time an additional projected member, such as a moving vane, is designed for the rotating body, and this requires a considerable amount of cost. Also, only the vibration of the vane to which the gauge is affixed can be measured, and no other vibration states can be determined. Especially when the length of the projected member is short, only one piece of gauge is available attached to one projected member and, naturally, the vibrating status of individual projected members can hardly be analyzed at one time but must be measured by replacing the gauge frequently.

Furthermore, because it is impossible to arbitrarily increase the number of terminals of a slip-ring or the number of channels of a tape recorder, the relationship between the mutual vibration phases of the projected members cannot be found simultaneously and, consequently, the test must be repeatedly conducted to obtain the phase relationship as a whole.

Still further, because the gauge comes in contact with the jet water and receives the centrifugal force due to rotation, it is therefore liable to be damaged. In addition, it is necessary to produce a new vibration exciting body 4 each time the ratio between the pitch of the vibration exciting part, such as a nozzle, and that of the projected member, such as a moving vane, is changed.

As mentioned above, the conventional rotary type vibration exciting apparatus requires a great deal of labor and time, and it is difficult to analyze the test result thereof, and a costly test is inevitable.

According to the conventional static vibration exciting method in which a magnet, shaker or the like is used to apply vibration to the projected members, such as moving vanes which are embedded in the rotating body such as a rotor projected members cannot be simultaneously excited at a vibration phase difference corresponding to the respective nozzle slip streams and, therefore, it is impossible to reproduce accurately the actual vibration exciting state.

SUMMARY OF THE INVENTION

This invention relates to the testing of rotors having projecting members, such as turbine rotors with projecting vanes and, more particularly, to a novel, simplified and much less expensive method and apparatus for effecting such testing with the rotor remaining stationary.

In accordance with the invention, a first vibration force whose number of vibrations is $n_1 \cdot n_2$, where $n_1$ represents the number of r.p.m. corresponding to the actual operating rotation speed of the rotating body, and $n_2$ the number of vibration exciting sources, is produced at a phase difference equivalent to $1/(n_1 \cdot n_3)$ which is the reciprocal of the product of the rotation number $n_1$ and the number $n_3$ of projected members of the rotating body. The second vibration force, whose number of vibrations is equal to rotation number $n_1$, is produced at a phase difference equivalent to reciprocal $1/(n_1 \cdot n_3)$, and first rotation force and second rotation force are applied in sequence to the projected members of a stationary rotatable body.

The invention has for its principal object an arrangement in which a vibration force similar to one which would be produced in the actual rotating condition is applied to the projected members without rotating the rotating body, whereby the vibration characteristics of the projected member, and especially the resonance characteristics with respect to the vibration exciting source, are accurately measured. In short, the invention eliminates the shortcomings inherent in the conventional art.

More specifically, according to the invention, the first vibration force whose vibration number is $n_1 \cdot n_2$ where $n_1$ represents the r.p.m. corresponding to the actual rotation speed of the rotating body and $n_2$ is the number of vibration exciting sources, and the second vibration force whose vibration number is equal to rotation number $n_1$ are applied in combination or superposition to the projected members of the rotating body. As a result, the projected member is excited each time the projected member rotates $n_1$ turns and passes before $n_2$ numbers of the vibration exciting sources within the unit time. Also, it is so arranged that a vibration force obtainable in the actual operating condition, wherein the vanes are excited by the partial admission, can be applied to the projected members, and the first and second vibration forces are applied sequentially and successively to adjacent projected members at a phase difference equivalent to $1/(n_1 \cdot n_3)$ which is the reciprocal of the product of rotation number $n_1$ and the number $n_3$ of the projected members. As a result, a vibration force can be given to the projected members sequentially at the same time interval as in the actual operating condition, and thus the actual vibration exciting state can accurately be simulated without rotating the rotating body.

As described above, the invention makes it possible to apply the same vibration force as would be obtained in the actual operating condition, without letting the rotating body revolve. Therefore the vibrating state of the projected member can be observed directly, detailed analysis can easily be made on the vibration mode with use of said pickup device connected to necessary points, and the vibration phase relationship of the whole of the projected members can easily be studied in a short time, since this method requires no slip-ring. Furthermore, because the vibration tests can be done without a specially made testing rotating body but with practical existing apparatus, the test time as well as operating cost can be markedly reduced. Still further, because it is not necessary to rotate the rotating body for the above purposes, the noise which is unavoidably present involved in the rotation of the rotating body in the prior art can be eliminated. Also, the method of this invention permits preventing the gauge from being damaged during test.

BRIEF DESCRIPTION OF THE DRAWINGS

In the drawings:

FIG. 5 is a diagrammatic illustration of input pulses applied to the circuit of FIG. 3 and of output pulses transmitted from this circuit to the respective piezoelectric elements;

FIGS. 11 and 12 are waveform diagrams illustrating the outputs generated from the circuit of FIG. 9;

FIG. 13 is a schematic diagram of the pulse inputs to a gate circuit;

FIG. 14 is a schematic diagram illustrating the pulse inputs to an adder circuit;

FIG. 18 is a waveform diagram of the outputs produced from the circuit of FIG. 16.

DESCRIPTION OF THE PREFERRED EMBODIMENTS

Figure 1:
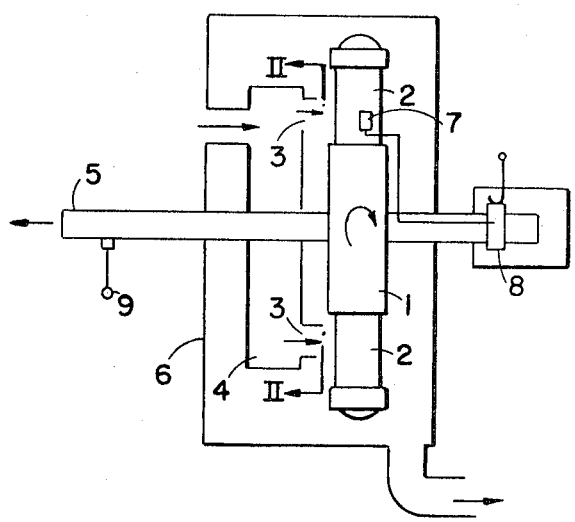
FIG. 1 is a schematic sectional view of a conventional vibration force exciting apparatus.
Figure 2:
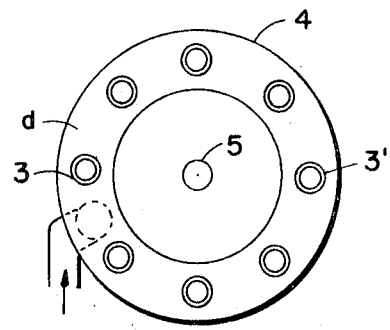
FIG. 2 is a sectional view taken on the line II—II of FIG. 1.
Figure 4:
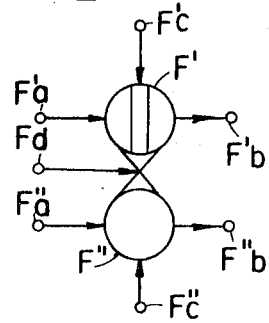
FIG. 4 is a schematic wiring diagram of flip-flops shown in FIG. 3.

The essential part of the first embodiment of the invention will be explained by referring to FIGS. 3 and 4, wherein only the first vibration force is applied to a turbine consisting of six moving vanes and one nozzle. The reference F denotes a flip-flop circuit and, as shown in FIG. 4, this flip-flop consists of a circuit F' for placing the flip-flop into the set state, and a circuit F'' for resetting the flip-flop. The set input terminal $Fa'$ of the set circuit F' is connected to the set output terminal $Fb'$ of the set circuit F' of the adjacent flip-flop by way of lead L and, similarly, the reset input terminal $Fa''$ of the reset circuit F'' is connected to the reset output terminal $Fb''$ of another adjacent reset circuit F''. In this manner, six flip-flops F, being the same number as that of the moving vanes of the turbine which is to be tested, are connected in a loop, thereby forming a flip-flop circuit.

Only the first flip-flop $F_1$ of the six flip-flops F is provided with a direct set input terminal $Fc'$, and direct reset input terminals $Fc''$ installed at the reset part F'' of flip-flops F are connected to a terminal D via lead wires R, and the terminal D is connected to the reset input terminal C by lead wire R'.

An initial setting single pulse is applied to direct set input terminal F'c. In this case, if more than two pulses are concurrently applied, the flip-flop will not be correctly operated. To avoid this, it is necessary to provide an arrangement for preventing chattering.

A trigger input terminal Fd is installed at each of the flip-flops F, the trigger input terminals Fd are connected to the loop wire S by way of lead S', and loop wire S is connected to a shift pulse transmitter (not shown diagramatically) via shift pulse terminal S''.

The lead wires L which connect the set parts F' of flip-flops F to each other are linked via respective leads E to associated piezoelectric elements P (made of titanic acid barium, etc.) disposed on moving vanes (not shown diagramatically).

When a set level control input (pulse) is given to the set input terminal F'a in the set part F' of flip-flop F, the flip-flop F is set, and the pulse is sent from the set output terminal F'b to the piezoelectric element P by way of leads L and E, and thus a vibration force is applied to the moving vane. On the other hand, a reset level control input is given to the reset input terminal F''a in the reset part F'', and the flip-flop F is reset. In this case, since the reset output terminal F''b is not connected to the piezoelectric element P, no vibration force is applied to the moving vane.

When a trigger input is applied to the trigger input terminal Fd, the flip-flop F is set on condition that a set level control input remains in the flip-flop F (namely, when a voltage is being applied thereto), or the flip-flop F is reset on condition that a reset level control input is present therein.

Note that it is so arranged that the set level control input and reset level control input are not simultaneously applied to the same flip-flop F.

Figure 3:
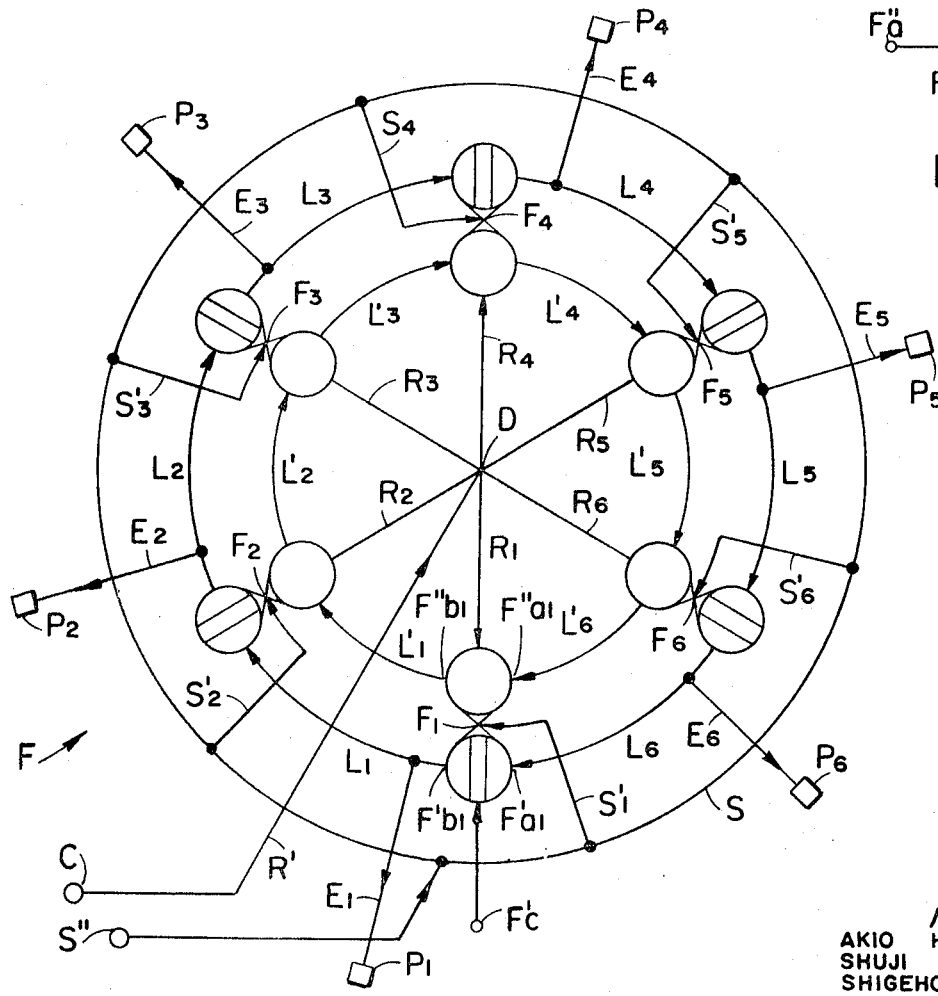
FIG. 3 is a schematic wiring diagram illustrating the essential circuit of one embodiment of the invention.
Figure 6:
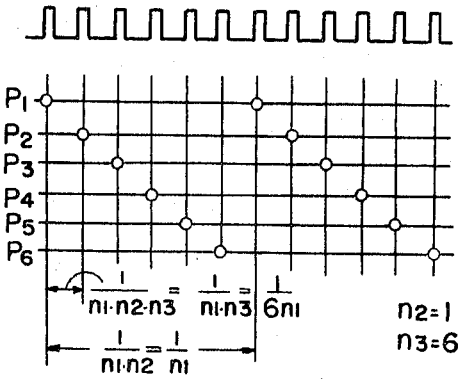
FIG. 6 is a diagrammatic illustration of how the output pulses are applied to the respective piezoelectric elements as in FIG. 5.

In the apparatus shown in FIGS. 3 and 4, when the reset input terminal C is closed, the reset pulse reaches all the flip-flops $F_1, F_2, \ldots, F_6$ by way of lead R', terminal D and leads R whereby all the flip-flops F are held in the reset state.

Under this condition, a voltage is applied to all leads $L_1', L_2', \ldots, L_6'$ which connect said reset part F'', but no voltage is applied to the leads $L_1, L_2, \ldots, L_6$.

Then, when an initial setting single pulse is applied to the direct set input terminal F'c provided at the first flip-flop $F_1$, only this flip-flop $F_1$ turns from reset state to set state, and the other flip-flops $F_2$ through $F_6$ are kept in the reset state. As a result, the lead $L_1'$ connecting the flip-flop $F_1$ to flip-flop $F_2$ becomes non-conducting, and the lead $L_1$ turns conducting and, consequently, a pulse is supplied to the piezoelectric element $P_1$ which is connected to lead $L_1$ via lead $E_1$ whereby the moving vane equipped with this piezoelectric element $P_1$ receives an impact force.

Since the flip-flops $F_2, F_3, \ldots, F_6$ are in the reset state, no pulse is given to the other piezoelectric elements $P_2$ through $P_6$. When the first shift pulse $fs_1$ is transmitted from the shift pulse transmitter (not shown diagramatically) to the shift pulse terminal S″, a trigger pulse input is applied to all the flip-flops F via the loop lead S connected to terminal S″ and leads $S_1', S_2', \ldots, S_6'$.

Under this condition, the first flip-flop $F_1$ is in the set state, but, since the lead $L_6'$ is conducting and receiving a reset level control input, first flip-flop $F_1$ turns into the reset state. The second flip-flop $F_2$ is in the reset state, but, since the lead $L_1$ is conducting and receiving a set level control input, this second flip-flop turns into the set state.

The third through sixth flip-flops $F_3$ through $F_6$ are all in the reset state and, since the leads $L_2'$ through $L_5$ are conducting, these third through sixth flip-flops remain in the reset state.

In the above manner, only the flip-flop $F_2$ turns into the set state by the first shift pulse $fs_1$ whereby the second piezoelectric element $P_2$ is actuated and only the second moving vane is vibrated.

After this operation, when the second shift pulse $fs_2$ is sent to the shift pulse terminal S″, only the third flip-flop $F_3$ turns into the set state as in the foregoing manner, and all other flip-flops $F_1, F_2, F_4, \ldots, F_6$ are reset and thus only the third moving vane receives an exciting force.

In the same way as above, when the third, fourth, ... shift pulses $fs_3, fs_4, \ldots$ are applied thereto, the fourth, fifth, ... flip-flops $F_4, F_5, \ldots$ are sequentially reset and thus the fourth, fifth, ... moving vanes receive an exciting force.

For this operation, theoretically, the frequency $fs'$ of the shift pulse $fs$ which is to be applied to the shift pulse terminal S″ must be made coincident with the value of the product $m_1 \cdot m_2 \cdot m_3$ where $m_1$ represents the number of rotations per unit time of the rotating body on which the moving vanes are mounted, $m_2$ is the number of stator vanes or nozzles, and $m_3$ is the number of moving vanes. In other words, frequency $fs'$ is determined so that $fs' = n_1 \times n_2 \times n_3$, to make the number of flip-flops F coincident with the number of moving vanes.

In the apparatus in FIGS. 3 and 4, the number $m_2$ of nozzles is one, and the number $m_3$ of moving vanes is six. FIG. 5 shows the relationship between the shift pulse $fs$ and the distribution pulse $fD$ applied to the first through sixth piezoelectric elements $P_1$ through $P_6$. In FIG. 5, when an initial setting single pulse is supplied thereto, the pulse is given to the first piezoelectric element $P_1$ whereby the first moving vane is excited. Then, when the first shift pulse $fs_1$ is applied thereto, the second piezoelectric element $P_2$ is actuated. Similarly, by sequential transmission of shift pulses $fs$, the third, fourth, ..., sixth piezoelectric elements $P_3, P_4, \ldots, P_6$ are actuated. Following this operation, when the sixth shift pulse $fs_6$ is transmitted, the first piezoelectric element $P_1$ is again actuated. The same moving vane receives an impact force at a time interval of $1/(n_1 \cdot n_2) = 1/n_1$ ($\therefore n_2 = 1$), and the succeedingly adjacent moving vanes receive an exciting force at the phase difference of $1/(n_1 \cdot n_3)$.

Therefore, by changing the frequency $fs'$ of the shift pulses $fs$, it is possible to reproduce the state wherein the r.p.m. of the rotating body, $(n_1 = fs'/(n_2 \cdot n_3))$, is changed.

Also, by changing the number of flip-flops F, it is equally possible to change the number of moving vanes.

According to the above apparatus, six flip-flops F are used whereby the vibration exciting state of the turbine, consisting of six moving vanes ($n_3 = 6$) and one nozzle ($n_2 = 1$), is reproduced. Now, if it is desired to reproduce the vibration exciting state of a turbine consisting of six moving vanes ($n_3 = 6$) and two nozzles ($n_2 = 2$), the following arrangement is necessary. Namely, the set output terminal $F'b_1$ of the set part $F_1'$ in the first flip-flop is connected in parallel to the first piezoelectric element $P_1$ installed at the first moving vane $F'b_3$ and to the fourth piezoelectric element $P_4$ of the fourth moving vane, and the set output terminal $Fb_3'$ of the third flip-flop $F_3$ is connected in parallel to the second piezoelectric element $P_2$ and the fifth piezoelectric element $P_5$, and the set output terminal $F'b_5$ of the fifth flip-flop $P_5$ is connected in parallel to the third and sixth piezoelectric elements $P_3$ and $P_6$ respectively.

Figure 7:
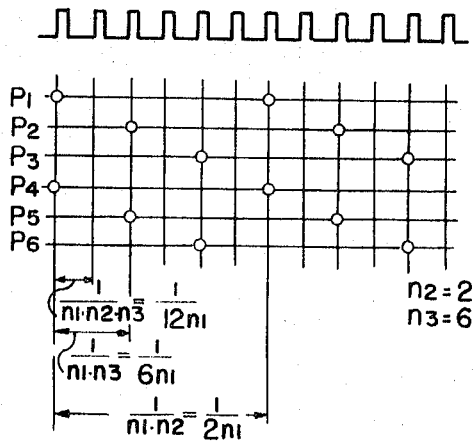
FIGS. 7 and 8 are diagrammatic illustrations with respect to a modification of the first embodiment of the invention and wherein the number of moving vanes and the number of nozzles have been changed.
Figure 8:
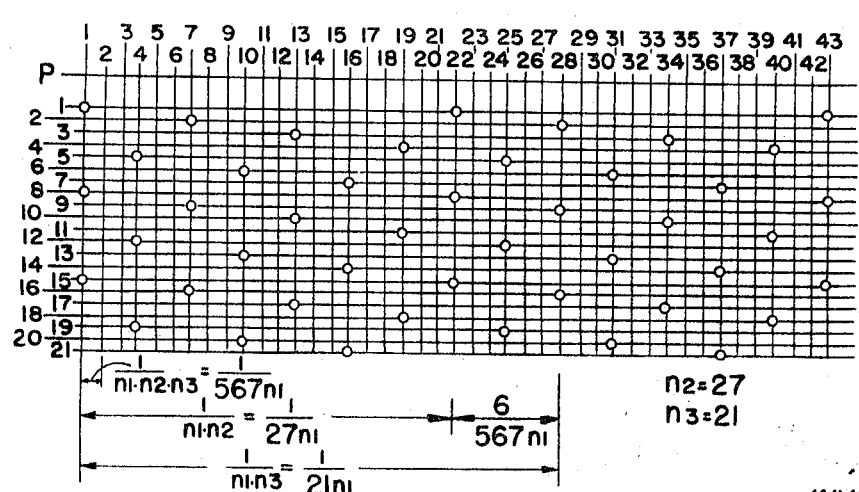

In the above arrangement, each piezoelectric element P receives a pulse at a time interval corresponding to $1/(n_1 \cdot n_2) = 1/2n_1$ as shown in FIG. 7, and thus each moving vane receives an impact force at a time interval corresponding to $1/(n_1 \cdot n_2) = 1/2n_1$, and a vibration exciting force is sequentially applied to the successively adjacent moving vanes at the phase difference corresponding to $1/(n_1 \cdot n_3) = 1/6n_1$ which is the product of shift pulse period $1/(n_1 \cdot n_2 \cdot n_3)$ and the number $n_2$ of nozzles. Then, the flip-flops $F_2, F_4$ and $F_6$ of which the set output terminals $F'b$ are not connected to the piezoelectric elements P are used for the purpose of frequency adjustment and phase lag adjustment.

When the turbine used is such that the number $n_3$ of its moving vanes is 21, and the number $n_2$ of its nozzles is 27, the following arrangement is necessary. Twenty one flip-flops, equal in number to the moving vanes, are connected in a loop as in the foregoing manner, and the flip-flops F are divided into seven groups based on the greatest common divisor 3 between the number ($n_3 = 21$ of moving vanes and the number ($n_2 = 27$) of nozzles. The first piezoelectric element $P_1$ is connected to the set output terminal $F'b_1$ of the first flip-flop $F_1$ in the first flip-flop group. Then, in the looped flip-flop network, the set output terminal $F'b_7$ of the seventh flip-flop $F_7$ which corresponds to 27th (27 is the number of nozzles) flip-flop counted from the first flip-flop $F_1$ to the second, third, ... flip-flops $F_2, F_3, \ldots$ (Note: The first flip-flop circuit $F_1$ also serves as the twenty-first one since the looped flip-flop network consists of 21 circuits) is connected to the second piezoelectric element $P_2$. Similarly, the third piezoelectric element $P_3$ is connected to the set output terminal $F'b_{13}$ of the thirteenth flip-flop $F_{13}$, and the fourth piezoelectric element $P_4$ to the nineteenth flip-flop output terminal $Fb_{19}$. By this arrangement, the first piezoelectric element $P_1$, the eighth piezoelectric element $P_8$ which corresponds to the seventh one counted from the first piezoelectric element ("7" represents the quotient arrived from by dividing $n_3 = 21$, being the number of the moving vanes, by 3 which is the greatest common divisor between $n_3 = 21$ being the number of moving vanes and $n_2 = 21$ being the number of nozzles) and the fifteenth piezoelectric element $P_{15}$ which is the seventh one from the eighth piezoelectric element are connected in parallel to the first flip-flop output terminal $F'b_1$ in the first flip-flop group.

These connections are tabulated in Table 1.

TABLE 1.

| Flip-flop Group No. | Flip-flop No. | Piezo electric Element No. | Flip-flop Group No. | Flip-flop No. | Piezo electric Element No. |
|---|---|---|---|---|---|
| 1 | 1 | 1, 8, 15 | 5 | 13 | 3, 10, 17 |
|   | 2 |   |   | 14 |   |
|   | 3 |   |   | 15 |   |
| 2 | 4 | 5, 12, 19 | 6 | 16 | 7, 14, 21 |
|   | 5 |   |   | 17 |   |
|   | 6 |   |   | 18 |   |
| 3 | 7 | 2, 9, 16 | 7 | 19 | 4, 11, 18 |
|   | 8 |   |   | 20 |   |
|   | 9 |   |   | 21 |   |
| 4 | 10 | 6, 13, 20 |   |   |   |
|   | 11 |   |   |   |   |
|   | 12 |   |   |   |   |

When flip-flops F are connected to the piezoelectric elements P in this manner and shift pulses are transmitted at a frequency of $n_1 \cdot n_2 \cdot n_3 = 567n_1$, 21 moving vanes receive an impact force at a time interval of $1/(n_1 \cdot n_2) = 1/(27n_1)$, and the successively adjacent moving vanes receive an impact force sequentially at the phase difference of $1/(n_1 \cdot n_3) = 1/(21n_1)$, namely $1/(21n_1) - 1/(27n_1 \, 1/(32 \, 6/(567n_1))$. (Note: Because the number of nozzles ($n_1 = 27$) is larger than the number of moving vanes ($n_1 = 21$), the moving vane adjacent to the preceding moving vane which is hit by a specific nozzle jet is hit by the nozzle jet adjacent to the specific nozzle before the adjacent vane is hit by the specific nozzle and, therefore the successively adjacent moving vanes are hit sequentially at the phase difference of $$\frac{1}{n_1 \cdot n_3} - \frac{1}{n_1 \cdot n_2} = \frac{n_2 - n_1}{n_1 \cdot n_2 \cdot n_3}$$

Figure 10:
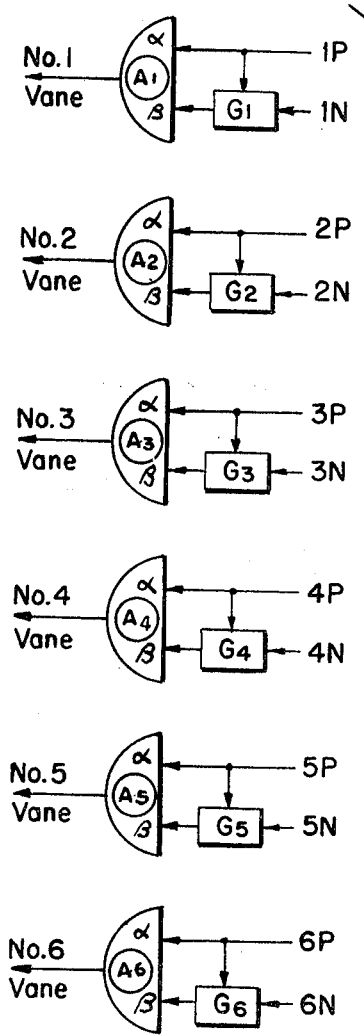
FIG. 10 is a schematic wiring diagram illustrating gate circuits and adder circuits connected to the circuits shown in FIG. 9.
Figure 9:
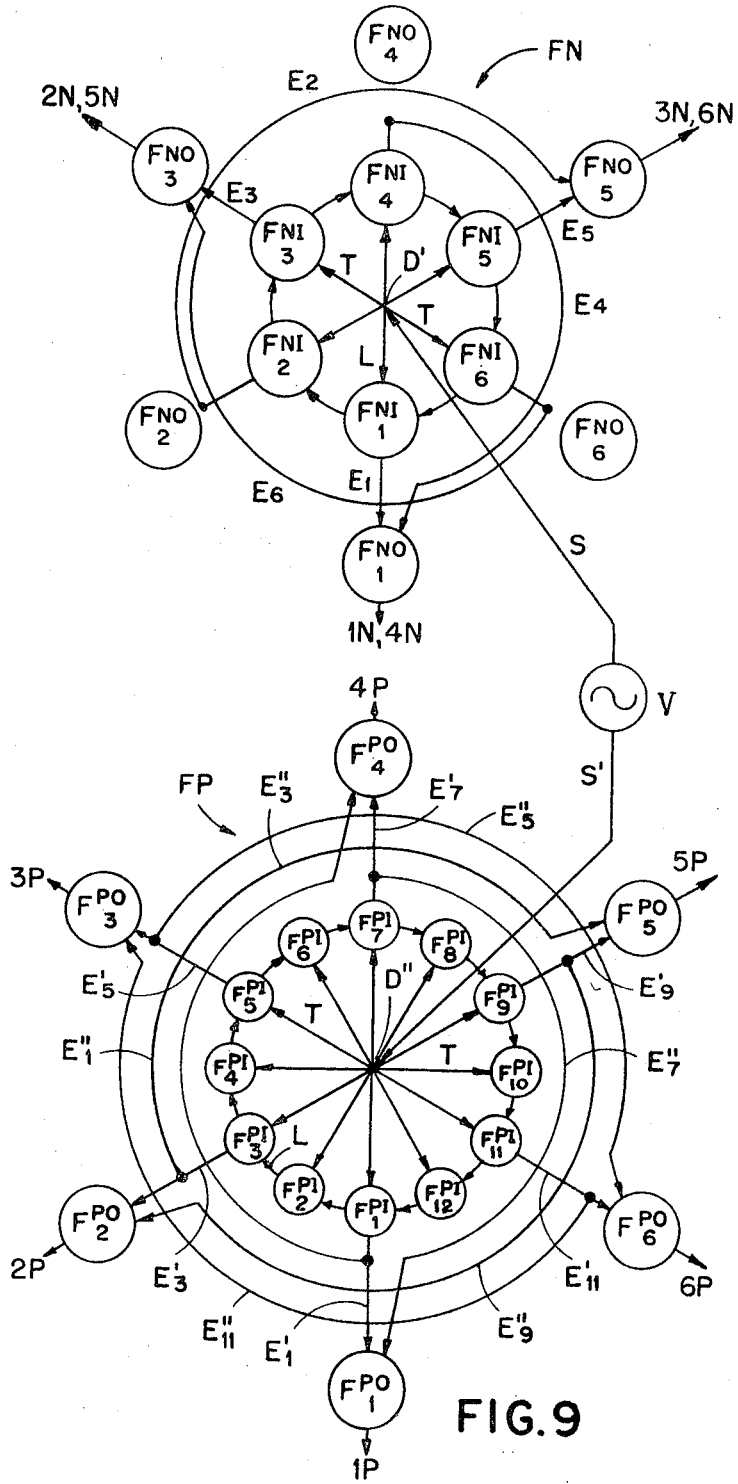
FIG. 9 is a schematic wiring diagram of the circuits used to produce the sequence illustrated in FIG. 8.

The first embodiment of the invention will more specifically be explained by referring to FIGS. 9 and 10, wherein the turbine used has six moving vanes ($n_3 = 6$) and two nozzles ($n_2 = 2$) and, when one of the nozzles is closed to shut off steam supply, the second vibration force is added to the first vibration force. (Note: The flip-flop circuit F shown in FIG. 9 is expressed by a circle for explanatory simplicity; this flip-flop is exactly the same as the flip-flop F, shown in FIGS. 3 and 4, in its construction and operation.)

The reference FN denotes a flip-flop circuit which is to produce the first vibration force. Similar to the foregoing apparatus, six first flip-flops ($n_3 = 6$), namely, $F_1^{NI}$ through $F_6^{NI}$ are connected in a loop, the trigger input terminals of these flip-flops are connected to a terminal D' by way of leads T, and terminal D' is connected to a shift pulse transmitter V via lead S. (Note: The reset input terminal connections shown in FIG. 3 are omitted in FIG. 9.) Six ($n_3 = 6$) second flip-flops $F_1^{NO}$ through $F_6^{NO}$ are disposed outside the flip-flops $F_1^{NI}$ through $F_6^{NI}$, the set input terminals of flip-flops $F_1^{NO}$, $F_3^{NO}$ and $F_5^{NO}$ are connected to the flipflops $F_1^{NI}$, $F_3^{NI}$ and $F_5^{NI}$ respectively, by way of leads $E_1$, $E_3$ and $E_5$, and the reset input terminals of flip-flops $F_1^{NO}$, $F_3^{NO}$ and $F_5^{NO}$ are connected to the flip-flops $F_4^{NI}$, $F_6^{NI}$ and $F_2^{NI}$ respectively, by way of leads $E_4$, $E_6$ and $E_2$.

The reference FP denotes a flip-flop circuit for producing the second vibration force (namely, the vibration force by partial admission), in which 12 ($n_2 \times n_3 = 12$) third flip-flops $F_1^{PI}$ through $F_{12}^{PI}$ are connected in a loop by leads L, the trigger input terminals of said flip-flops $F_1^{PI}$ through $F_{12}^{PI}$ are connected to a terminal D'' by way of leads T, and this terminal D'' is connected to shift pulse transmitter V via lead S'.

The six fourth flip-flops $F_1^{PO}$ through $F_6^{PO}$ are disposed outside the flip-flops $F_1^{PI}$ through $F_{12}^{PI}$, and also the set input terminals of flip-flops $F_1^{PO}$ through $F_6^{PO}$ are connected to flip-flops $F_1^{PI}$, $F_1^{PI}$, $F_5^{PI}$, $F_7^{PI}$, $F_9^{PI}$ and $F_{11}^{PI}$ by way of leads $E_1'$, $E_3'$, $E_5'$, $E_7'$, $E_9'$ and $E_{11}'$, and the reset input terminals of flip-flops $F_1^{PO}$ through $F_6^{PO}$ are connected to flip-flops $F_7^{PI}$, $F_9^{PI}$, $F_{11}^{PI}$, $F_1^{PI}$, $F_3^{PI}$ and $F_5^{PI}$ respectively, by way of leads $E_7''$, $E_9''$, $E_{11}''$, $E_1''$, $E_3''$ and $E_5''$.

In the above arrangement, the flip-flops $F_1^{NI}$ through $F_6^{NI}$ (hereinafter referred to as "FNI") located inside the flip-flop circuit FN and also the flip-flops $F_1^{PI}$ through $F_{12}^{PI}$ (hereinafter referred to as "FPI") located inside the flip-flop circuit FP are reset in the foregoing manner, and then an initial setting single pulse is applied to the flip-flops $F_1^{NI}$ and $F_1^{PI}$ whereby these two flip-flops turn into the initial set state.

After this process, a trigger input whose frequency f's is ($n_1 \times n_2 \times n_3$) is applied from transmitter V to flip-flops FNI and also to the flip-flops FPI by way of leads S and S' and connection T. By doing this, flip-flops $F_1^{NI}$ and $F_1^{PI}$ in the initial set state change their set states sequentially.

In the circuit FNI, as has been described, the period at which a certain specific flip-flop (for example, $F_1^{NI}$) is set is $1/(n_1 \cdot n_2)$ (frequency is $n_1 \cdot n_2$), and the phase difference between the flip-flop $F_1^{NI}$ setting and the following flip-flop $F_2^{NI}$ setting is given in terms of time difference $1/(n_1 \cdot n_2 \cdot n_3)$. Therefore, when $n_2 = 2$ and $n_3 = 6$, the proper flip-flop output of the circuit FNI to be corresponding to the fundamental waveform of the first vibration force given to each moving vane is shown in the following table.

| Moving Vane No. | Flip-flop No. of Circuit (FNI) |
|---|---|
| 1 | $F_1^{NI}$ |
| 2 | $F_3^{NI}$ |
| 3 | $F_5^{NI}$ |
| 4 | $F_1^{NI}$ |
| 5 | $F_3^{NI}$ |
| 6 | $F_5^{NI}$ |

By arranging as above, the frequency of the exciting force upon each moving vane is $n_1$, and the phase difference between the exciting forces applied to the first moving vane and to the second moving vane is $1/(n_1 \cdot n_2)$, thus making this operation similar to the actual operating state of the apparatus.

In the circuit FPI, since the number of loop flip-flops is 12 ($n_2 \cdot na3 = 2 \times 6 = 12$), the period at which a certain specific flip-flop, for example, $F_1^{PI}$, is set is $1/n_1$ (frequency is $n_1$), and phase difference between the flip-flop $F_1^{PI}$ setting and the following flip-flop $F_2^{PI}$ setting is given in terms of time difference $1/(n_1 \cdot n_2 \cdot n_3)$.

The following table shows which output of a flip-flop of the circuit FPI is to correspond to the fundamental waveform of the second vibration force given to each moving vane.

| Moving Vane No. | Flip-flop No. of Circuit (FPI) |
|---|---|
| 1 | $F_1^{PI}$ |
| 2 | $F_3^{PI}$ |
| 3 | $F_5^{PI}$ |
| 4 | $F_7^{PI}$ |
| 5 | $F_9^{PI}$ |
| 6 | $F_{11}^{PI}$ |

In the above arrangement, the frequency of the exciting force upon each moving vane is $n_1$, and the phase difference between the exciting forces applied to the first moving vane and to the second moving vane is $1/(n_1 \cdot n_3)$, thus making this operation similar to the actual operating state of the apparatus.

As described above, the frequencies of the first and second vibration forces and the phase difference applied to the individual moving vanes can perfectly be simulated to those of the actual apparatus in operation by the use of only the circuits FNI and FPI. Practically, however, the vibration forces applied to the actual apparatus is not a pulsing one but one having a certain definite width and, in this point, it is impossible to simulate them only by circuits FNI and FPI.

In order to increase the pulse width so as to accomplish simulation as to also the pulse width, flip-flops $F_1^{NO}$ through $F_6^{NO}$ (hereinafter referred to as "FNO") are disposed outside the circuit FNI, and also flip-flops $F_1^{PO}$ through $F_6^{PO}$ (hereinafter referred to as "FPO") are disposed outside the circuit FPI.

With respect to the first vibration force, the impact factor of a square wave (the impact factor is represented by $a:b$ where $a$ is the width of the square wave, $b$ is one cycle) is normally determined to be 1:2 since the pulse width of the vibration force due to the nozzle slip stream in the actual machine is unknown.

To this end, as shown in FIG. 9, the output of flip-flop $F_1^{NI}$ is given as a set input to the flip-flop $F_1^{NO}$, and the output of flip-flop $F_4^{NI}$ is given as a reset input to the flip-flop $F_1^{NO}$. By so arranging, the flip-flop $F_1^{NO}$ is set when the flip-flop $F_1^{NI}$ is set, and this flip-flop $F_1^{NO}$ remains in the set state, and will be reset when the flip-flop $F_4^{NI}$ is set.

Because the flip-flop $F_1^{NO}$ is set when the flip-flop $F_1^{NI}$ is set, the period and timing of $F_1^{NO}$ are the same as those of $F_1^{NI}$, excepting that the pulse width of $F_1^{NO}$ is amplified.

In this case, $n_3$ is 6 in the circuit FNI and the output of flip-flop $F_1^{NI}$ is given as a set input to the flip-flop $F_1^{NO}$, and the output of the third flip-flop ($n_3/2 = 3$) is supplied as a reset input to the flip-flop $F_1^{NO}$. Therefore its impact factor should be 1:2. If $n_3$ is odd, it is necessary to give ($n_3/2 = 1$) th flip-flop output as a reset input thereto.

FIG. 11 shows pulse widths in relation to flip-flops and moving vanes.

The pulse width of the first vibration force may suitably be changed by changing the reset signal to the circuit FPO.

In the actual machine, the ratio between the nozzle number ($n_2$) with no steam shutoff portion and the nozzle numbers ($n_1^0$) with steam flow is determined. Accordingly the pulse width must be reproduced accurately. The impact factor in the actual apparatus is $n_1^0 : n_2$, and the ratio between the time required for a certain moving vane to run through the section of nozzles $n_1^0$ which flows steam and the time required for this vane to run through the steam shutoff section is $$\frac{n_2^0}{n_1 \cdot n_2} : \frac{n_2}{n_1 \cdot n_2}.$$

Whereas, according to this embodiment, one of the two nozzles ($n_2 = 2$) is closed to stop the steam flow and, accordingly, steam is supplied round one half the circle and no steam is supplied round the other half of the circle. Therefore, the waveform of the second vibration force pulse is expressed by $n_1^0 : n_2 = 1 : 2$ in terms of impact factor.

To produce the second vibration force, the circuit FPO is arranged as shown in FIG. 9. Namely, the output of flip-flop $F_1^{PI}$ is used as a set input to the flip-flop $F_1^{PO}$, and the output of flip-flop $$F_{(n3 \cdot n_2 0+1)}{}^{PI},$$

namely $F_7^{PI}$ is used as its reset input. Therefore the flip-flop $F_1^{PO}$ is set when the flip-flop $F_1^{PI}$ is set, and $F_1^{PO}$ remains in the set state until the flip-flop $F_7^{PI}$ is reset. In other words, the pulse width is expanded to the impact factor of 1:2. The circuit FPI for producing the second vibration force is a loop of ($n_2 \times n_3$) numbers of flip-flops. As described above, these flip-flops change their set states sequentially upon receiving a trigger input whose frequency is $n_1 \cdot n_2 \cdot n_3$. Therefore the time difference between setting of the flip-flop $F_1^{PI}$ and setting of the flip-flop $$(F_{n3 \cdot n_2 0+1}{}^{PI})$$

is expressed by $$\frac{n_3 \cdot n_2^0}{n_1 \cdot n_2 \cdot n_3} = \frac{n_2^0}{n_1 \cdot n_2}$$

and thus the pulse width of the second vibration force in the actual machine can accurately be reproduced. The output waveforms of this operation are illustrated in FIG. 12.

Generally, when the output of flip-flop $F_1^{PI}$ is used as a set input to the flip-flop $F_1^{PO}$, it is necessary that the output of the flip-flop $$(F_{n3 \cdot n_2 0+1}{}^{PI})$$

which is $(n_3 \cdot n_2^0)^{th}$ from the one next to the flip-flop $F_1^{PI}$ is used as its reset input.

In the above manner, the first and second vibration forces having suitable pulse widths are provided. Now, FIG. 11 is an example wherein no steam shutoff portion is arranged for the first vibration force. Since the first vibration force is not exerted when the moving vane passes through the steam shutoff part, a vibration force similar to that in the actual machine is obtained by superposing the first vibration force upon the second vibration force only after the first vibration force ceases in the steam shutoff section.

To realize this arrangement, six gate circuits $G_1$ through $G_6$, being equal to the moving vanes in number, and also adder circuits $A_1$ through $A_6$ are used as shown in FIG. 10. Namely, the output of the flip-flop $F_1^{NO}$ is given to the gate circuits $G_1$ and $G_4$, the output of flip-flop $F_3^{NO}$ to the gate circuits $G_2$ and $G_5$, and the output of the flip-flop $F_5^{NO}$ to the gate circuits $G_3$ and $G_6$.

The outputs of flip-flops $F_1^{PO}$ through $F_6^{PO}$ are applied to the gate circuits $G_1$ through $G_6$ and to the adder circuits $A_1$ through $A_6$ respectively, and the outputs of adder circuits $A_1$ through $A_6$ are given to the individual moving vanes.

In the apparatus as above, the first vane will be explained below. As shown in FIG. 13, when the output of the flip-flop $F_1^{NO}$ and the output of the flip-flop $F_1^{PO}$ are applied to the gate circuit $G_1$, the output of the gate circuit $G_1$ allows to pass the pulse of the flip-flop $F_1^{NO}$ only for the period the flip-flop $F_1^{PO}$ is set. In this state, the waveform of the pulse given to the adder circuit $A_1$ is as shown on the right of the gate circuit in FIG. 13. The pulse from the gate circuit $G_1$ and the pulse from the flip-flop $F_1^{PO}$ are given to the adder circuit $A_1$ whereby these two pulses are added together as shown in FIG. 14. In this case, because the first vibration force differs from the second vibration force, the pulses are multiplied by $\alpha$ and $\beta$ according to the magnitude of the first and second vibration forces and then added in the adder circuit $A_1$. As a result, the waveform of the pulse delivered from the adder circuit $A_1$ is as shown on the left of the adder circuit $A_1$ in FIG. 14.

Figure 15:
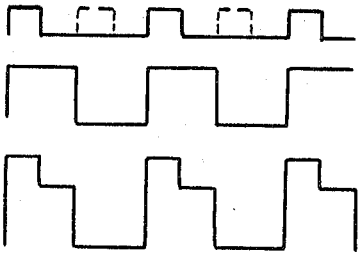
FIG. 15 is an explanatory diagram of the output pulses emitted from the apparatus illustrated in FIGS. 9 and 10.

As described above, the number of adder circuits A is $n_3$ which is the same as that of the moving vanes. The outputs of these adder circuits are applied to the individual moving vanes, and the combined vibration force is as shown in FIG. 15. Namely, this combined vibration force is exactly the same as that obtained in the actual apparatus.

In the apparatus as described above, the same vibration force as that produced in the actual apparatus is produced but, on the other hand, the necessary number of flip-flops is $3n_3 + n_3 \cdot n_2$. In other words, a great many flip-flops are required for an actual turbine. This makes the apparatus complicated in construction and expensive in cost.

Figure 17:
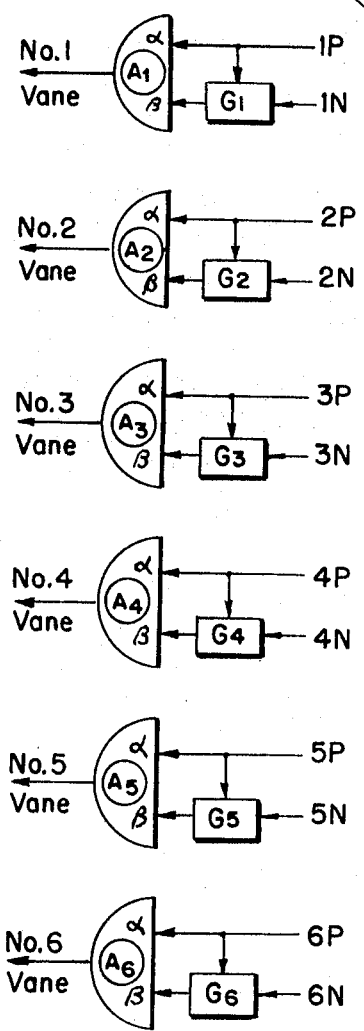
FIG. 17 is a schematic wiring diagram of gate circuits and adder circuits connected to the circuit of FIG. 16.
Figure 16:
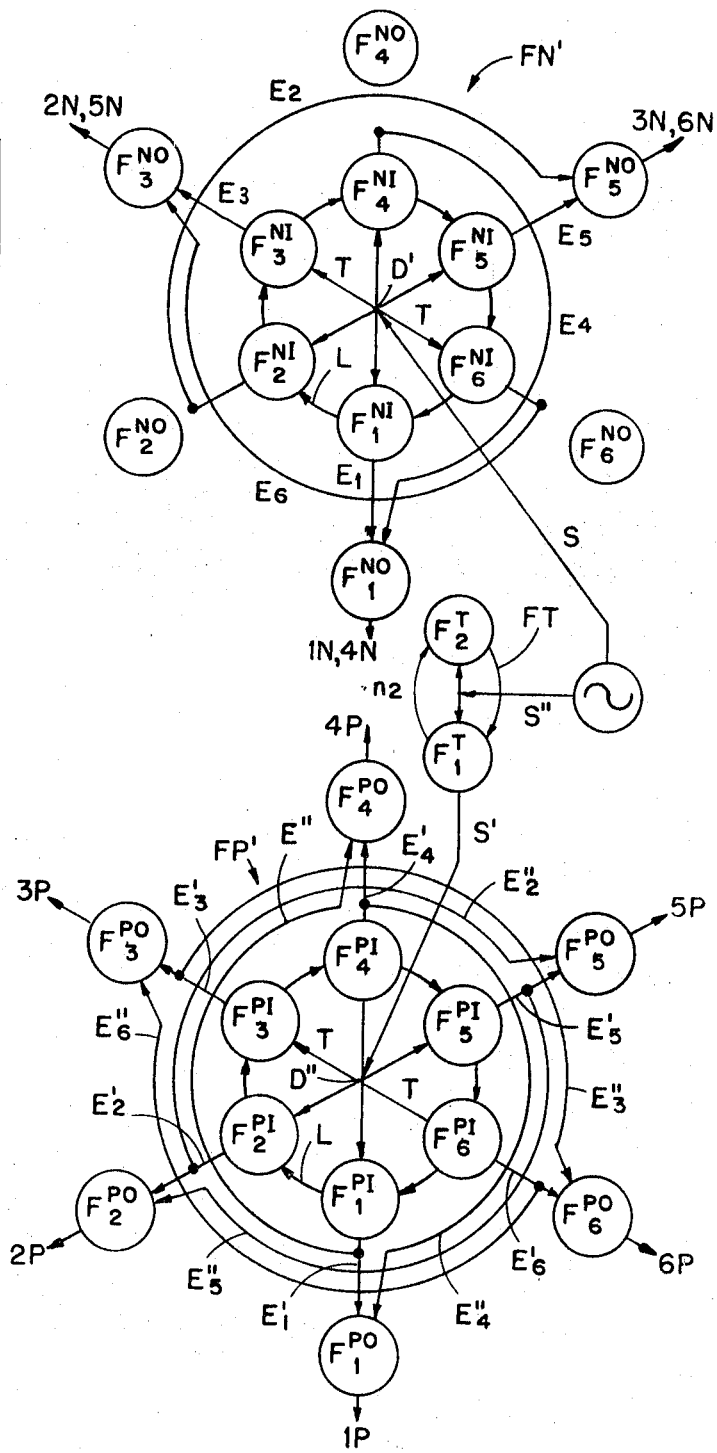
FIG. 16 is a schematic wiring diagram of a second embodiment of the invention.

FIGS. 16 and 17 illustrate the second embodiment of the invention wherein the first embodiment is simplified. (Note: The components common to the first embodiment are omitted.)

The flip-flop circuit FN' is exactly the same as that FN in FIG. 9 in construction.

FP' denotes a flip-flop circuit for producing the second vibration force. ($n_3 = 6$) numbers of flip-flops $F_1^{PI}$ through $F_6^{PI}$ (hereinafter referred to as FPI') are disposed inside the flip-flop circuit FP', and ($n = 6$) numbers of flip-flops $F_1^{PO}$ through $F_6^{PO}$ (hereinafter referred to as FPO') are disposed outside the flip-flop circuit FP'. The flip-flops $F_1^{PI}$ through $F_6^{PI}$ are connected to the set input terminals of the outer flip-flops $F_1^{PO}$ through $F_6^{PO}$ respectively by way of leads $E_1'$ through $E_6'$, and also the flip-flops $F_4^{PI}$, $F_5^{PI}$, $F_6^{PI}$, $F_1^{PI}$, $F_2^{PI}$ and $F_3^{PI}$ are connected to the reset input terminals of the outer flip-flops respectively by way of leads $E_4''$, $E_5''$, $E_6''$, $E_1''$, $E_2''$ and $E_3''$.

FT is a flip-flop circuit for supplying a trigger input to circuit FP' and consists of two ($n_2 = 2$) fifth flip-flops $F_1^T$ and $F_2^T$. The output of this flip-flop circuit FT is connected to a terminal D'' which is connected to the trigger input terminals of flip-flops $F_1^{PI}$ through $F_6^{PI}$ via leads T. A shift pulse transmitter V is connected to the circuit FT via lead S''.

In the above apparatus, the circuits FNI, FT and FPI' are reset in the same manner as in the first embodiment, the flip-flops $F_1^{NI}$, $F_1^T$ and $F_1^{PI}$ are in the initial-set state, and then a trigger input (frequency: $n_1 \cdot n_2 \cdot n_3$) from the transmitter V is applied sequentially to all of the flip-flops of circuits FNI and FT. By this operation, the flip-flops in the initial set state in both circuits change their set state sequentially.

In this case, as described in the foregoing embodiment, the output frequency of circuit FNI is $n_1 \cdot n_2$, and that of circuit FT is $n_1 \cdot n_3$. The phase difference, in both circuits FNI and FT, between the mutually adjacent flip-flops, is expressed by $1/(n_1 \cdot n_2 \cdot n_3)$.

Under this condition, when the output of flip-flop $F_1{}^T$ is given as the trigger input to the circuit FPI'', the set state of the flip-flop $F_1{}^{PI}$ which has the initial-set state is shifted sequentially. However, since the output frequency of the circuit FT is $n_1 \cdot n_3$, the phase difference between the mutually adjacent flip-flops in the circuit FPI' is given by $1/(n_1 \cdot n_3)$.

As described above, because the circuit FPI' consists of six ($n_3 = 6$) flip-flops in a loop, the output of a certain specific flip-flop must repeat its set state at a period of $1/(n_1 \cdot n_3) \times n_2 = 1/n_1$. In other words, $n_3$ outputs of $1/(n_1 \cdot n_3)$ of the mutually adjacent flip-flops are delivered at a frequency of $n_1$. This means that the output of the circuit FPI' can accurately simulate to the second vibration force in view of frequency and phase difference.

The impact factor regarding the pulse of the second vibration force is $n_2{}^0 : n_2$, as described in the foregoing embodiment. Therefore the time difference (namely, the pulse width) in the setting of pulses of the second vibration force in the condition that the r.p.m. is $n_1$ is expressed by $n_2{}^0/(n_1 \cdot n_2)$ per rotation of the turbine.

The trigger input to the circuit FPI' is the output of the circuit FT and, accordingly, its frequency is $n_1 \cdot n_3$, and period is $1/(n_1 \cdot n_3)$.

Therefore, when the flip-flop $F_1{}^{PO}$ is set by the use of flip-flop $F_1{}^{PI}$ and is reset by the flip-flop which is the $n'^{th}$ one from the one next to the flip-flop $F_1{}^{PI}$, then the flip-flop $F_1{}^{PO}$ will remain in the set state for the period of $n'/(n_1 \cdot n_3)$. Since the pulse width of the second vibration force in the actual apparatus is $n_2{}^0/(n_1 \cdot n_2)$, thus, $$\frac{n'}{n_1 \cdot n_3} = \frac{n_2{}^0}{n_1 \cdot n_2}$$

$$n' = \frac{n_2 \cdot n_3{}^0}{n_2}$$

In this embodiment, $n_2 = 2$, $n_3 = 6$ and $n_2{}^0 = 1$, and therefore, $$n = \frac{6 \times 1}{2} = 3$$

Namely, when the flip-flop $F_1{}^{PO}$ is reset by the flip-flop $F_4{}^{PI}$ which is the third one from that next to the flip-flop $F_1{}^{PI}$, it is possible to produce exactly the same pulse width as in the actual machine. These operation states are illustrated in FIG. 18.

In this embodiment, in comparison with the previous embodiment, the number of flip-flops can be made smaller.

For example, when $n_3 = 100$ and $n_2 = 100$, then $3 \times n_3 + n_3 \times n_2 = 10,300$ flip-flops must be provided in the foregoing embodiment, whereas, in the second embodiment, $4 \times n_3 + n_2 = 500$ of them will suffice.

In this embodiment, $(n_3 \cdot n_2{}^0)/n_2$ will not always become an integer. In such case, the pulse width of the actual apparatus is not perfectly reproduced. To obtain the approximate pulse width of the actual apparatus, an integer $n''$ close to $(n_3 \cdot n_2{}^0)/n_2$ is obtained, and the flip-flop $F_1{}^{PO}$ is reset by the $n''^{th}$ flip-flop.

In this second embodiment, the first vibration force, gate circuits, and adder circuits are the same as those in the first embodiment in construction and functions.

What is claimed is:

1. A vibration force exciting method for testing rotary bodies having radially projecting members, such as vaned turbine rotors, said method comprising the steps of producing a first vibration force whose number of vibrations is equal to the product of the design r.p.m. of the body and the number of vibration exciting sources to which the body is subjected during each revolution when in operation; and, while maintaining the rotary body stationary, applying said first vibration source sequentially and successively to the projecting members of the body at a phase difference equal to the reciprocal of the product of the design r.p.m. of the body and the number of projecting members thereon, producing a second vibration force whose number of vibrations is equal to the design r.p.m. of the body; superposing the first vibration force on the second vibration force during only the period in which the second vibration is produced; and, while maintaining the rotary body stationary, applying the superposed resultant vibration force sequentially and successively to adjacent projecting members of the rotary body at such phase difference.

2. A vibration force exciting apparatus for testing rotary bodies having radially projecting members, such as vaned turbine rotors, while the rotary bodies are stationary, said apparatus comprising, in combination, a plurality of first flip-flops each having a set input, a set output, a reset input, a reset output, a direct reset input and a trigger input, and at least one flip-flop having a direct set input; means connecting said flip-flops in a loop arrangement with the set output of each flip-flop being connected to the set input of the next succeeding flip-flop, and a reset output of each flip-flop being connected to the reset input of the next succeeding flip-flop; the number of said first flip-flops being equal to the number of radially projecting members on the rotary body being tested while stationary; a shift pulse transmitter connected to all of said trigger inputs in parallel; a reset pulse input terminal connected to all of said direct reset inputs in parallel; a direct set pulse terminal connected to said direct reset input of said one flip-flop; respective vibration producing elements adapted to be mounted on each of the projecting members of the rotary body; and means connecting each vibration producing element to the reset output terminal of a respective flip-flop, second flip-flops equal in number to said first flip-flops and to the number of the projecting members of the rotary body; means connecting said second flip-flops to said first flip-flops so that the impact factor on the radially projecting members of the rotary body is the same as that during actual operation of the rotary body; third flip-flops connected in a loop arrangement and equal in number to the product of the number of projecting members and the number of vibration exciting sources to which the rotary body is subjected during each revolution when in operation; means connecting said transmitter to all of the trigger inputs of said third flip-flops in parallel; fourth flip-flops each connected to a pair of said third flip-flops, each pair of third flip-flops comprising two third flip-flops spaced apart, in sequence, by a number of third flip-flops equal to one less than half the number of third flip-flops, so that the impact factor effective on the radially projecting members of the rotary body is equal to the ratio between the actual number of the vibration exciting sources and the number of vibration exciting sources actually supplying vibration forces to the radially projecting members of the rotary body; and means connecting each fourth flip-flop to a respective vibration exciting element.

3. A vibration force exciting apparatus, as claimed in claim 2, including a number of gate circuits equal to the number of radially projecting members of the rotary body; means connecting one input of each gate circuit to a respective one of said second flip-flops and the other input of each gate circuit to the respective one of said fourth flip-flops corresponding to such respective one of said second flip-flops; a number of adder circuits equal to the number of gate circuits, and each having one input connected to the output of the associated gate circuit and the other input connected directly to the output of the respective fourth flip-flop; and means connecting the output of each adder circuit to a respective vibration producing element.

4. A vibration force exciting apparatus, as claimed in claim 3, including a number of fifth flip-flops equal in number to the number of vibration force exciting sources, and arranged in loop; means connecting the trigger input terminals of said fifth flip-flops to said transmitter; and means connecting the output of the loop arrangement of fifth flip-flops to the trigger inputs of said fourth flip-flops in parallel.

* * * * *